(12) United States Patent
Ho et al.

(10) Patent No.: US 10,613,832 B2
(45) Date of Patent: Apr. 7, 2020

(54) RANDOM NUMBER GENERATING SYSTEM AND RANDOM NUMBER GENERATING METHOD THEREOF

(71) Applicant: Winbond Electronics Corp., Taichung (TW)

(72) Inventors: Wen-Chiao Ho, Taichung (TW); Pil-Sang Ryoo, Taichung (TW)

(73) Assignee: Winbond Electronics Corp., Taichung (TW)

( * ) Notice: Subject to any disclaimer, the term of this patent is extended or adjusted under 35 U.S.C. 154(b) by 77 days.

(21) Appl. No.: 15/844,643

(22) Filed: Dec. 18, 2017

(65) Prior Publication Data

US 2019/0107999 A1  Apr. 11, 2019

(30) Foreign Application Priority Data

Oct. 11, 2017  (CN) .......................... 2017 1 0941000

(51) Int. Cl.
*G06F 7/58* (2006.01)
*G06F 1/04* (2006.01)
*G06F 7/62* (2006.01)

(52) U.S. Cl.
CPC ................ *G06F 7/582* (2013.01); *G06F 1/04* (2013.01); *G06F 7/588* (2013.01); *G06F 7/62* (2013.01)

(58) Field of Classification Search
None
See application file for complete search history.

(56) References Cited

U.S. PATENT DOCUMENTS 6,771,104 B2    8/2004  Hars
7,653,855 B2 *  1/2010  Yasuda .............. G01R 31/3181
                                                       714/728

(Continued)

FOREIGN PATENT DOCUMENTS

CN    102375722    3/2012
CN    105247471    1/2016

(Continued)

OTHER PUBLICATIONS

"Office Action of Taiwan Counterpart Application", dated May 7, 2018, pp. 1-11.

*Primary Examiner* — Michael D. Yaary
(74) *Attorney, Agent, or Firm* — JCIPRNET

(57) ABSTRACT

A random number generation system and a random number generation method thereof are provided. The random number generation system includes a random number generator, a random number selection circuit, and a random number logic circuit. The random number generator receives the random number request signal to provide a first random number sequence with n bits, where n is a positive integer. The random number selection circuit receives the random number request signal to provide a bit selection signal with n bits, wherein the bit selection signal is a time varying signal and is determined by the received random number request signal. The random number logic circuit receives the random number request signal, the first random number sequence and the bit selection signal, and in response to the random number request signal to adjust the first random number sequence using the bit selection signal to provide the second random number sequence.

12 Claims, 4 Drawing Sheets

(56) References Cited

U.S. PATENT DOCUMENTS

| | | | |
|---|---|---|---|
| 8,966,217 B2 | 2/2015 | Colombo et al. | |
| 9,037,624 B1 | 5/2015 | Hars et al. | |
| 2004/0096060 A1* | 5/2004 | Henry | G06F 7/58 |
| | | | 380/46 |
| 2007/0005672 A1* | 1/2007 | Yushiya | G06F 7/58 |
| | | | 708/250 |
| 2010/0201419 A1 | 8/2010 | Vasyltsov et al. | |

FOREIGN PATENT DOCUMENTS

| | | |
|---|---|---|
| CN | 106293617 | 1/2017 |
| CN | 106528049 | 3/2017 |
| TW | 200414026 | 8/2004 |
| TW | 200415507 | 8/2004 |
| TW | 201413580 | 4/2014 |
| TW | 201604773 | 2/2016 |

\* cited by examiner

RANDOM NUMBER GENERATING SYSTEM AND RANDOM NUMBER GENERATING METHOD THEREOF

CROSS-REFERENCE TO RELATED APPLICATION

This application claims the priority benefit of China application serial no. 201710941000.5, filed on Oct. 11, 2017. The entirety of the above-mentioned patent application is hereby incorporated by reference herein and made a part of this specification.

TECHNICAL FIELD

The invention is related to a way of generating a random number, and particularly to a random number generating system and a random number generating method thereof.

DESCRIPTION OF RELATED ART

In recent years, along with prosperous development of computer information technology, use of memory product becomes increasingly frequent, and information security issue of memory product also becomes significantly important. Generally speaking, a key is required for memory product to encrypt/decrypt data, or the key is required to ensure whether external access (e.g., reading, writing, erasing) is permitted. Specifically, the key may be a random number generated by a random number generator, and repetition of the random number is decisive to security of data. It is an important issue in the field of design of random number generator to find out how to reduce repetition (i.e., increase the count of non-repetitive sequence) of random number.

SUMMARY OF INVENTION

The invention provides a random number generating system and a random number generating method thereof, which are capable of performing a second process on a random number generated by a random number generator, and outputting processed random number so as to increase unpredictability of the random number.

In the invention, the random number generating system includes a random number generator, a random number selection circuit and a random number logic circuit. The random number generator receives a random number request signal to provide a first random number sequence with n bits in response to the random number request signal, wherein n is a positive integer. The random number selection circuit receives the random number request signal to provide a bit selection signal with n bits in response to the random number request signal, wherein the bit selection signal is a time varying signal and is determined by the received random number request signal. The random number logic circuit is coupled to the random number generator as well as the random number selection circuit, and receives the random number request signal, the first random number sequence and the bit selection signal, and in response to the random number request signal to adjust the first random number sequence using the bit selection signal to provide a second random number sequence.

In the invention, a random number generating method includes the following steps. A first random number sequence with n bits is provided by a random number generator in response to a random number request signal, wherein n is a positive integer. A bit selection signal with n bits is provided by a random number selection circuit in response to the random number request signal, wherein the bit selection signal is a time varying signal and determined by the random number request signal. The first random number sequence is adjusted using a bit selection signal by a random number logic circuit in response to the random number request signal to provide a second random number sequence.

In summary, according to the embodiment of the invention, in the random number generating system and the random number generating method thereof, the random number logic circuit can determine whether to adjust the logic level of each bit in the first random number sequence in response to the logic level of each bit in the bit selection signal as the time varying signal so as to generate the second random number sequence. In this manner, the unpredictability of the second random number can be increased.

In order to make the aforementioned features and advantages of the invention more comprehensible, embodiments accompanying figures are described in detail below.

DESCRIPTION OF EMBODIMENTS

Figure 1A:
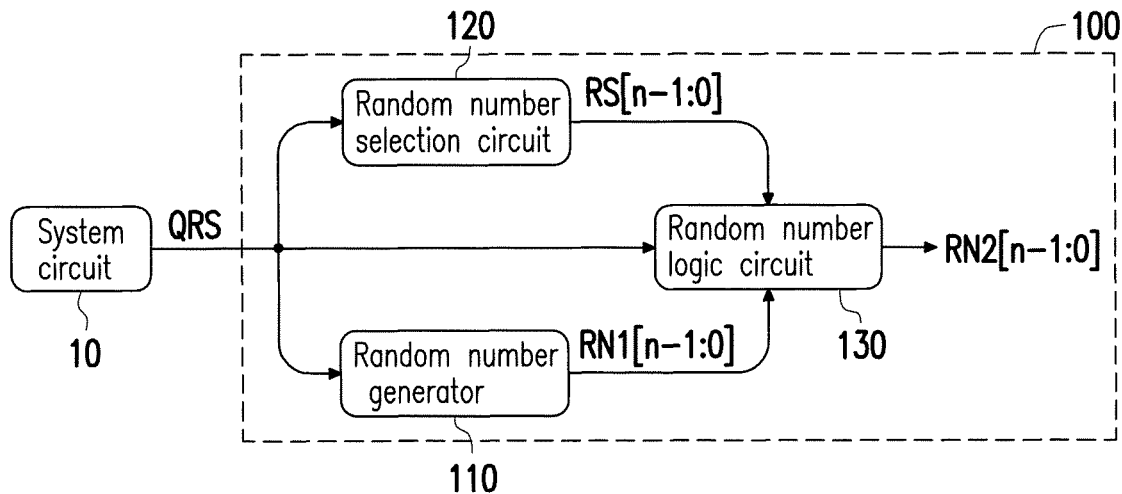
FIG. 1A is a system diagram illustrating a random number generating system according to an embodiment of the invention.

FIG. 1A is a system diagram illustrating a random number generating system according to an embodiment of the invention. Referring to FIG. 1A, in the embodiment, a random number generating system 100 receives a random number request signal QRS provided by a system circuit 10 to provide a set of random umber sequence (e.g., RN2) in response to the random number request signal QRS, and the random number generating system 100 includes a random number generator 110, a random number selection circuit 120 and a random number logic circuit 130.

The random number generator 110 receives the random number request signal QRS to provide a first random number sequence RN1 with n bits in response to the random number request signal QRS, wherein n is a positive integer, and the random number generator 110 may be a known random number generator of any type and structure; the embodiment of the invention provides no limitation thereto.

The random number selection circuit 120 receives the random number request signal QRS to provide a bit selection signal RS with n bits in response to the random number request signal QRS, wherein the bit selection signal RS is a time varying signal and determined by the received random number request signal QRS. The random number logic circuit 130 is coupled to the random number generator 110 as well as the random number selection circuit 120, and receives the random number request signal QRS, the first random number sequence RN1 and the bit selection signal RS. The random number logic circuit 130 in response to the random number request signal QRS adjusts the first random number sequence RN1 using the bit selection signal RS to provide a second random number sequence RN2.

Specifically, the $k^{th}$ bit of the bit selection signal RS corresponds to the $k^{th}$ bit of the first random number sequence RN1, wherein k is a positive integer smaller than or equal to n. When the logic level of the $k^{th}$ bit of the bit selection signal RS is a first logic level (e.g., "0"), the logic level of the $k^{th}$ bit in the first random number sequence RN1 is adjusted; for example, assuming that the logic level is set as an inverting logic level or a predetermined logic level. When the logic level of the $k^{th}$ bit of the bit selection signal RS is a second logic level (e.g., "1"), the logic level of the $k^{th}$ bit in the first random number sequence RN1 is not adjusted, that is, maintained to be the initial logic level. Additionally, in other embodiment, "1" may be set as the first logic level and "0" may be set as the second logic level. Furthermore, any other logic levels that can be distinguished from each other may be employed to be respectively set as the first logic level and the second logic level.

Based on the above, since the random number logic circuit determines whether to adjust the logic level of each bit in the first random number sequence in response to the logic level of each bit in the bit selection signal as the time varying signal so as to generate the second random number sequence, in this manner, the unpredictability of the second random number can be increased.

Figure 1B:
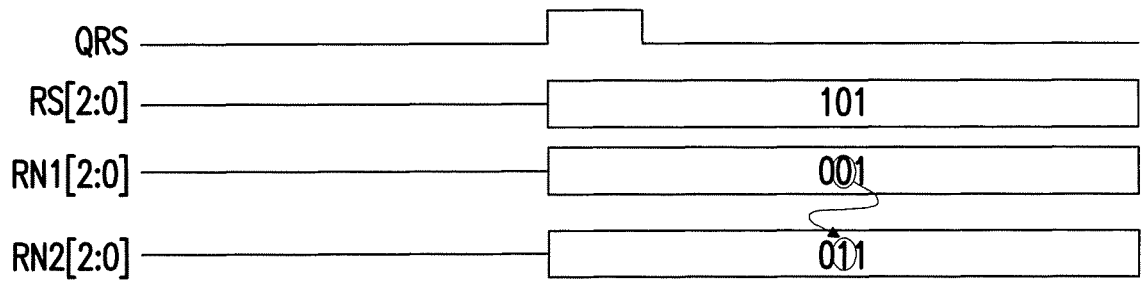
FIG. 1B is a waveform diagram illustrating a random number generating system according to an embodiment of the invention.

FIG. 1B is a waveform diagram illustrating a random number generating system according to an embodiment of the invention. Referring to FIG. 1A and FIG. 1B, in the embodiment, n is set as 3 as an example. When the random number request signal QRS is disabled (low voltage level is used here as an example), the random number generating system 100 is not operated; when the random number request signal QRS is enabled (high voltage level is used here as an example), the random number generating system 100 generates the random number sequence in response to the enabled random number request signal QRS. Furthermore, the random number generator 110 provides the first random number sequence RN1 having a value of "001" in response to the enabled random number request signal QRS; the random number selection circuit 120 provides the bit selection signal RS having a value of "101" in response to the enabled random number request signal QRS.

When the bit of the bit selection signal RS is the logic level "0", the random number logic circuit 130 inverts the logic level of the corresponding bit in the first random number sequence RN1; when the bit of the bit selection signal RS is the logic level "1", the random number logic circuit 130 does not process the corresponding bit (i.e., logic level maintains to be the same) in the first random number sequence RN1. Based on the above, after the first random number sequence RN1 having the value of "001" is processed by the random number logic circuit 130, the second random number sequence RN2 having the value of "011" is provided.

Figure 2A:
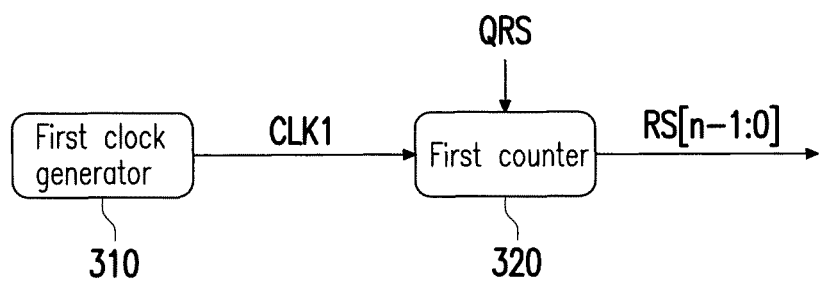
FIG. 2A is a system diagram illustrating a random number selection circuit according to an embodiment of the invention.

FIG. 2A is a system diagram illustrating a random number selection circuit according to an embodiment of the invention. Referring to FIG. 1A and FIG. 2A, in the embodiment, the random number selection circuit 120 includes a first clock generator 310 and a first counter 320. The first clock generator 310 generates the first clock signal CLK1, wherein the operation of the first clock generator 310 is irrelevant to the operation of the system circuit 10 and the random number generator 110. The first counter 320 receives the first clock signal CLK1 and the random number request signal QRS to perform cycle counting according to the first clock signal CLK1, and provides the bit selection signal RS in response to the random number request signal QRS.

In other words, when the random number generating system 100 receives power source, the first clock generator 310 immediately provides the first clock signal CLK1 to drive the first counter 320 to count continuously. Meanwhile, when the random number request signal QRS is enabled, the current counting result is provided as the bit selection signal RS.

Figure 2B:
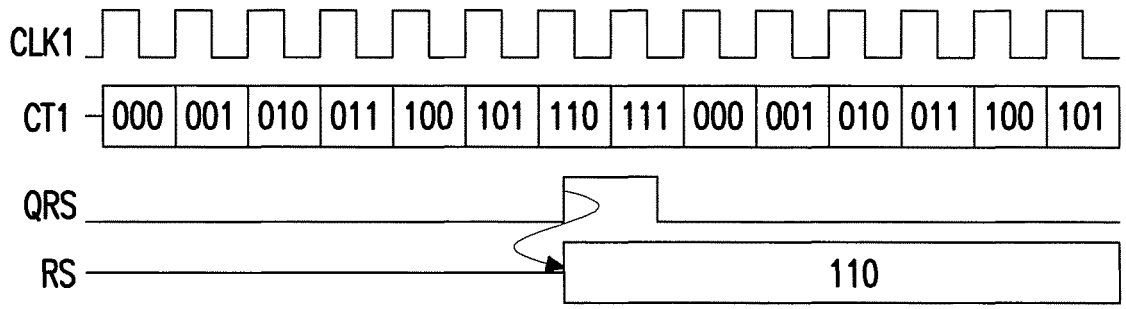
FIG. 2B is a waveform diagram illustrating a random number selection circuit according to an embodiment of the invention.

FIG. 2B is a waveform diagram illustrating a random number selection circuit according to an embodiment of the invention. Referring to FIG. 2A and FIG. 2B, in the embodiment, the first counter 320 is exemplified as a counter with 3 bits; in other words, a counting value CT1 of the first counter 320 may be counted from "000" to "111" and repeated continuously. Next, when the random number request signal QRS is disabled (low voltage level is used here as an example), the first counter 320 does not output the counting value CT1; when the random number request signal QRS is enabled (high voltage level is used here as an example), the first counter 320 provides the value of "110" of the current counting result CT1 as the bit selection signal RS.

Figure 3:
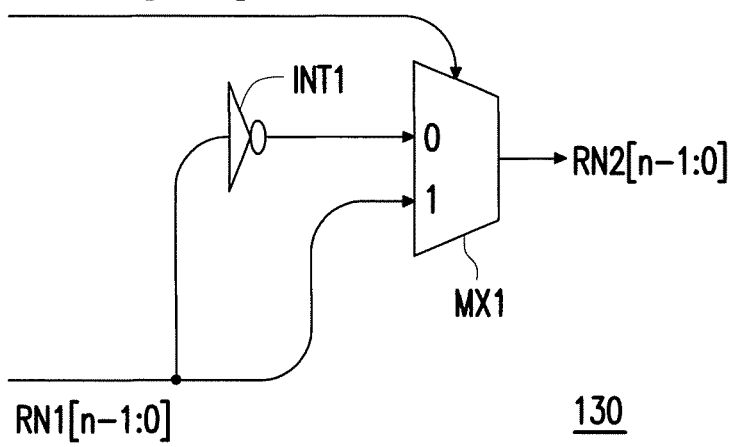
FIG. 3 is a system diagram illustrating a random number logic circuit according to an embodiment of the invention.

FIG. 3 is a system diagram illustrating a random number logic circuit according to an embodiment of the invention. Referring to FIG. 1A and FIG. 3, in the embodiment, the random number logic circuit 130 includes an inverter INT1 and a first multiplexer MX1. The inverter INT1 has an input end receiving the first random number sequence RN1 and an output end. The first multiplexer MX1 has a first input end receiving the first random number sequence RN1, a second input end coupled to the output end of the inverter INT1 and a control end receiving the bit selection signal RS. Specifically, when the bit of the bit selection signal RS is logic level "0", the first multiplexer MX1 provides the logic level of the output end of the inverter INT1; when the bit of the bit selection signal RS is logic level "1", the first multiplexer MX1 provides the logic level of the corresponding bit in the first random number sequence RN1.

Figure 4A:
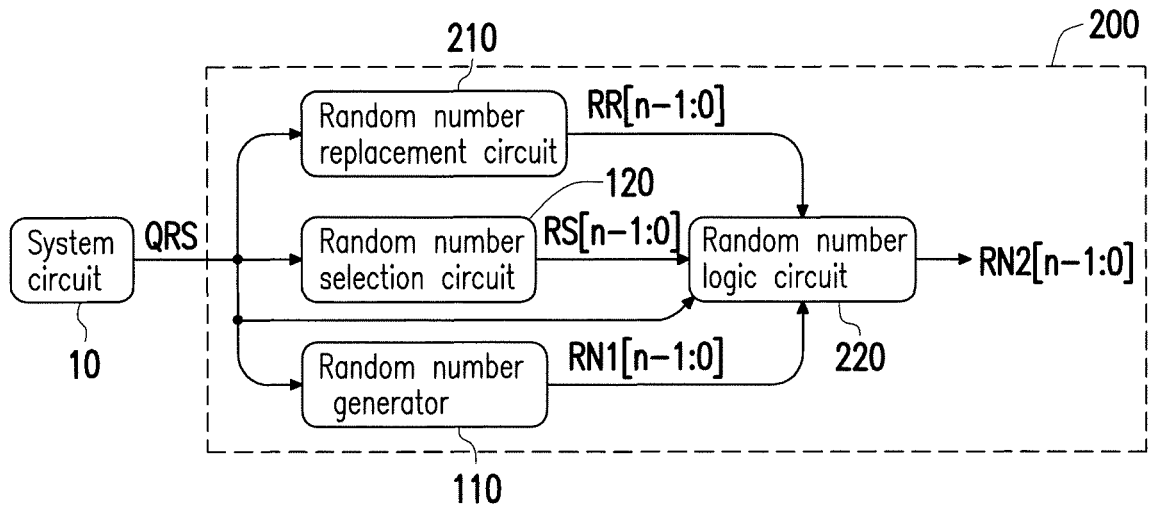
FIG. 4A is a system diagram illustrating a random number generating system according to another embodiment of the invention.

FIG. 4A is a system diagram illustrating a random number generating system according to another embodiment of the invention. Referring to FIG. 1A and FIG. 4A, in the embodiment, relative to the random number generating system 100, a random number generating system 200 is different in a random number replacement circuit 210 and a random number logic circuit 220. The random number replacement circuit 210 receives the random number request signal QRS to provide a bit replacement signal RR with n bits in response to the random number request signal QRS, wherein the bit replacement signal RR is a time varying signal and determined by the received random number request signal QRS. The random number logic circuit 220 is coupled to the random number generator 110, the random number selection circuit 120 and the random number replacement circuit 210, and receives the random number request signal QRS, the first random number sequence RN1, the bit selection signal RS and the bit replacement signal RR. The random number logic circuit 220 in response to the random number request signal QRS adjusts the first random number sequence RN1 using the bit selection signal RS and the bit replacement signal RR to provide the second random number sequence RN2.

Furthermore, the $k^{th}$ bit of the bit selection signal RS and the $k^{th}$ bit of the bit replacement signal RR corresponds to the $k^{th}$ bit of the first random number sequence RN1, wherein k is a positive integer that is smaller than or equal to n. When the logic level of the $k^{th}$ bit of the bit selection signal RS is the first logic level (e.g., "0"), the logic level of the $k^{th}$ bit in the first random number sequence RN1 is set (or replaced by) as the logic level of the $k^{th}$ bit in the bit replacement signal RR; when the logic level of the $k^{th}$ bit of the bit selection signal RS is the second logic level (e.g., "1"), the logic level of the $k^{th}$ bit in the first random number sequence RN1 is not adjusted, i.e., maintained to be the initial logic level. In addition, in other embodiment, "1" may be set as the first logic level and "0" may be set as the second logic level. Furthermore, any other logic level that can be distinguished from each other may be respectively set as the first logic level and the second logic level.

Based on the above, since the random number logic circuit determines the way of adjusting the logic level of each bit in the first random number sequence in response to the logic level of each bit of the bit selection signal and the logic level of each bit in the bit replacement signal so as to generate the second random number sequence, in this manner, the unpredictability of the second random number can be further increased. Wherein, the bit selection signal and the bit replacement signal are time varying signals.

Figure 4B:
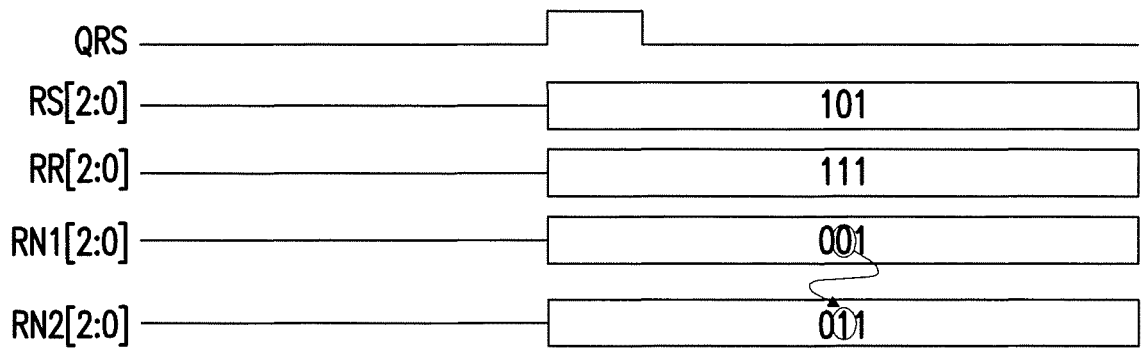
FIG. 4B is a waveform diagram illustrating a random number generating system according to another embodiment of the invention.

FIG. 4B is a waveform diagram illustrating a random number generating system according to another embodiment of the invention. Referring to FIG. 4A and FIG. 4B, herein, n is exemplified as 3. When the random number request signal QRS is disabled (low voltage level is used here as an example), the random number generating system 200 is not operated; when the random number request signal QRS is enabled (high voltage level is used here as an example), the random number generating system 200 generates the random number sequence in response to the enabled random number request signal QRS. Specifically, the random number generator 110 provides the first random number sequence RN1 having the value of "001" in response to the enabled random number request signal QRS; the random number selection circuit 120 provides the bit selection signal RS having the value of "101" in response to the enabled random number request signal QRS; and the random number replacement circuit 210 provides the bit replacement signal RR having the value of "111" in response to the enabled random number request signal QRS.

When the bit of the bit selection signal RS is logic level "0", the random number logic circuit 220 set the logic level of the corresponding bit in the first random number sequence RN1 as the logic level of the corresponding bit in the bit replacement signal RR; when the bit of the bit selection signal RS is the logic level "1", the random number logic circuit 130 does not process the corresponding bit (i.e., logic level maintains to be the same) in the first random number sequence RN1. Based on the above, after the first random number sequence RN1 having the value of "001" is processed by the random number logic circuit 130, the second random number sequence RN2 having the value of "011" is provided.

Figure 5A:
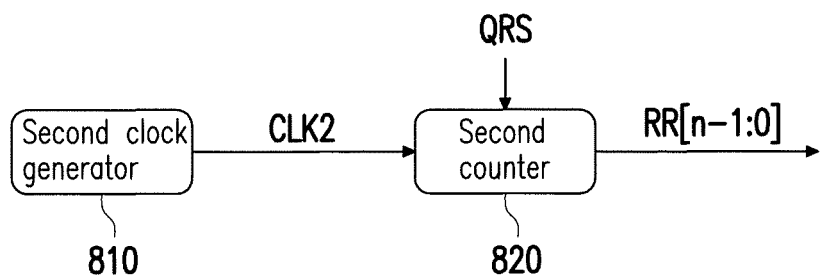
FIG. 5A is a system diagram illustrating a random number replacement circuit according to an embodiment of the invention.

FIG. 5A is a system diagram illustrating a random number replacement circuit according to an embodiment of the invention. Referring to FIG. 4A and FIG. 5A, in the embodiment, the random number replacement circuit 210 includes a second clock generator 810 and a second counter 820. The second clock generator 810 generates a second clock signal CLK2, wherein the operation of the second clock generator 810 is irrelevant to the operation of the system circuit 10, the random number generator 110 and the random number selection circuit 120. The second counter 820 receives the second clock signal CLK2 and the random number request signal QRS to perform cycle counting according to the second clock signal CLK2, and provides the bit replacement signal RR in response to the random number request signal QRS.

In other words, when the random number generating system 100 receives power source, the second clock generator 810 immediately provides the second clock signal CLK2 so as to drive the second counter 820 to count continuously. Meanwhile, when the random number request signal QRS is enabled, the current counting result is provided as the bit replacement signal RR.

Figure 5B:
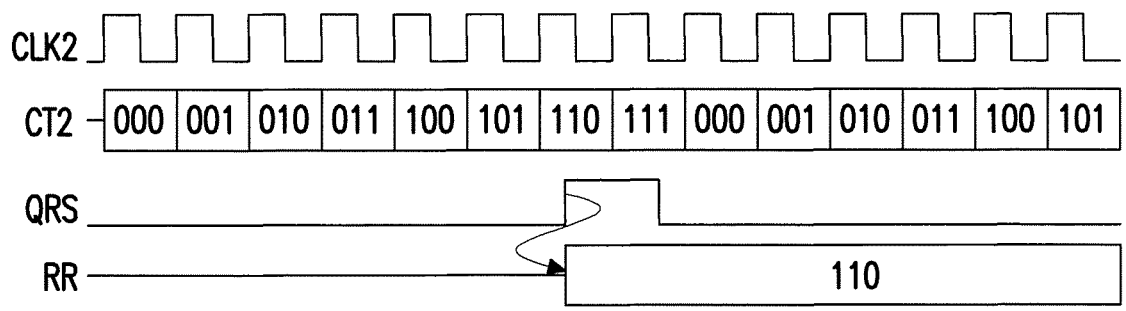
FIG. 5B is a waveform diagram illustrating a random number replacement circuit according to an embodiment of the invention.

FIG. 5B is a waveform diagram illustrating a random number replacement circuit according to an embodiment of the invention. Referring to FIG. 5A and FIG. 5B, in the embodiment, the second counter 820 is exemplified as the counter with 3 bits; that is, a counting value CT2 of the second counter 820 may be counted from "000" to "111" and repeated continuously. Next, when the random number request signal QRS is disabled (low voltage level is used here as an example), the second counter 820 does not output the counting value CT2; when the random number request signal QRS is enabled (high voltage level is used here as an example), the second counter 820 provides the value "110" of the current counting result CT2 as the bit replacement signal RR.

Figure 6:
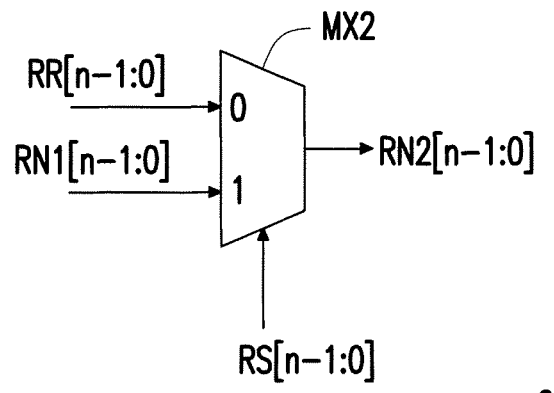
FIG. 6 is a system diagram illustrating a random number logic circuit according to another embodiment of the invention.

FIG. 6 is a system diagram illustrating a random number logic circuit according to another embodiment of the invention. Referring to FIG. 4A and FIG. 6, in the embodiment, the random number logic circuit 220 includes a second multiplexer MX2. The second multiplexer MX2 has a first input end receiving the first random number sequence RN1, a second input end receiving the bit replacement signal RR, and a control end receiving the bit selection signal RS. Furthermore, when the bit of the bit selection signal RS is logic level "0", the second multiplexer MX2 provides the logic level of the corresponding bit in the bit replacement signal RR; when the bit of the bit selection signal RS is logic level "1", the second multiplexer MX2 provides the logic level of the corresponding bit in the first random number sequence RN1.

Additionally, in some embodiments, the random number logic circuit (e.g., 130, 220) may record a repeating number m. The meaning of the repeating number m is the same number sequence of the first random number sequence RN1 is repeatedly generated every m times. For example, the $1^{st}$ first random number sequence RN1 and the $m+1^{th}$ first random number sequence RN1 are the same number sequence, the $2^{nd}$ first random number sequence RN1 and the $m+2^{th}$ first random number sequence RN1 are the same number sequence, and so on. Moreover, after the provision of the second random number sequence RN2 reaches the above-mentioned repeating number in, the random number logic circuit (e.g., 130, 220) compares the m+1$^{th}$ second random number sequence RN2 with the 1$^{st}$ second random number sequence RN2 to determine whether to provide again the m+1$^{th}$ second random number sequence RN2. Specifically, when the m+1$^{th}$ second random number sequence RN2 is different from the 1$^{st}$ second random number sequence RN2, the random number logic circuit (e.g., 130, 220) does not provide the m+1$^{th}$ second random number sequence RN2 again. When the m+1$^{th}$ second random number sequence is the same as the 1$^{st}$ second random number sequence RN2, the random number logic circuit (e.g., 130, 220) may use displacement, discarding or perform any logic calculation on the m+1$^{th}$ second random number sequence RN2 so as to provide a new m+1$^{th}$ second random number sequence RN2.

Figure 7:
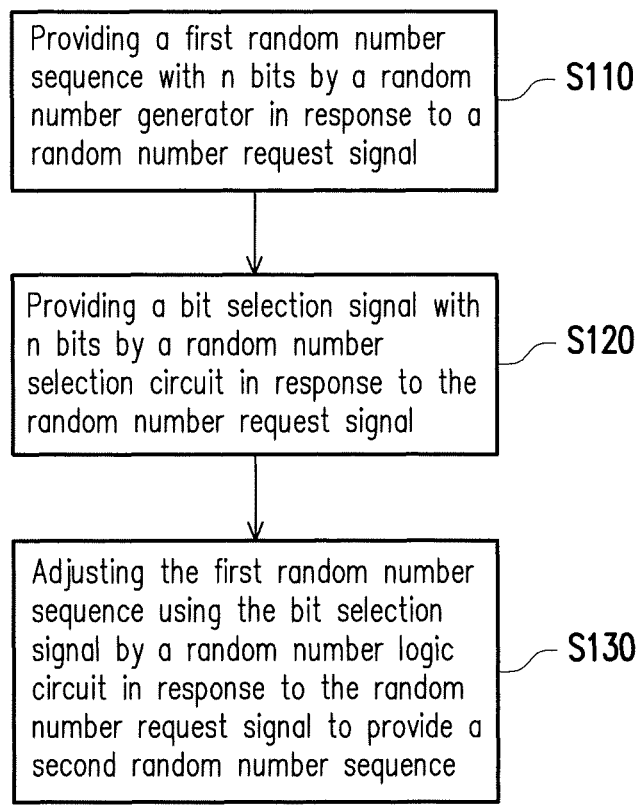
FIG. 7 is a flowchart illustrating a random number generating method according to an embodiment of the invention.

FIG. 7 is a flowchart illustrating a random number generating method according to an embodiment of the invention. Referring to FIG. 7, in the embodiment, the random number generating method includes the following steps. In step S110, a first random number sequence with n bits is provided by a random number generator in response to a random number request signal, wherein n is a positive integer. In step S120, a bit selection signal with n bits is provided by a random number selection circuit in response to the random number request signal, wherein the bit selection signal is a time varying signal and determined by the random number request signal. In step S130, the first random number sequence is adjusted by a random number logic circuit using the bit selection signal in response to the random number request signal to provide the second random number sequence. Specifically, the sequence of steps S110, S120 and S130 are used for descriptive purpose, which should not be construed as a limitation to the embodiment of the invention. Meanwhile, the embodiments of FIG. 1A, FIG. 1B, FIG. 2A, FIG. 2B, FIG. 3, FIG. 4A, FIG. 4B, FIG. 5A, FIG. 5B and FIG. 6 may serve as reference for the details of steps S110, S120 and S130, and thus no further descriptions are incorporated herein.

In summary, according to the embodiment of the invention, in the random number generating system and the random number generating method thereof, the random number logic circuit can determine whether to adjust the logic level of each bit in the first random number sequence in response to the logic level of each bit in the bit selection signal as the time varying signal so as to generate the second random number sequence. In this manner, the unpredictability of the second random number can be increased. Meanwhile, the random number logic circuit can determine the way of adjusting the logic level of each bit in the first random number sequence in response to the logic level of each bit in the bit selection signal as the time varying signal and the logic level of each bit in the bit replacement signal of as time varying signal so as to generate the second random number sequence. In this manner, the unpredictability of the second random number can be increased.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A random number generating system, comprising:
   a random number generator, receiving a random number request signal, and providing a first random number sequence with n bits in response to the random number request signal, wherein n is a positive integer;
   a random number selection circuit, receiving the random number request signal, and providing a bit selection signal with n bits in response to the random number request signal, wherein the bit selection signal is a time varying signal and determined by the received random number request signal; and
   a random number logic circuit, coupled to the random number generator and the random number selection circuit, and receiving the random number request signal, the first random number sequence and the bit selection signal, and in response to the random number request signal to adjust the first random number sequence using the bit selection signal to provide a second random number sequence,
   wherein when a logic level of a k$^{th}$ bit of the bit selection signal is a first logic level, a logic level of a k$^{th}$ bit in the first random number sequence is set as an inverting logic level, when the logic level of the k$^{th}$ bit of the bit selection signal is a second logic level, the logic level of the k$^{th}$ bit in the first random number sequence maintains to be an initial logic level, wherein k is a positive integer smaller than or equal to n.

2. The random number generating system according to claim 1, wherein the random number logic circuit comprises:
   an inverter, having an input end receiving the first random number sequence and an output end; and
   a first multiplexer, having a first input end receiving the first random number sequence, a second input end coupled to the output end of the inverter, and a control end receiving the bit selection signal.

3. The random number generating system according to claim 1, wherein the random number selection circuit comprises:
   a first clock generator, generating a first clock signal, wherein an operation of the first clock generator is irrelevant to an operation of the random number generator; and
   a first counter, receiving the first clock signal and the random number request signal so as to perform a cycle counting, and providing the bit selection signal in response to the random number request signal.

4. The random number generating system according to claim 1, further comprising:
   a random number replacement circuit, coupled to the random number logic circuit, receiving the random number request signal, and providing a bit replacement signal with n bits in response to the random number request signal, wherein the bit replacement signal is a time varying signal and determined by the received random number request signal, the random number logic circuit in response to the random number request signal adjusts the first random number sequence using the bit selection signal and the bit replacement signal to provide the second random number sequence.

5. The random number generating system according to claim 4, wherein when the k$^{th}$ bit of the bit selection signal is the first logic level, the k$^{th}$ bit in the first random number sequence is set as a logic level of a k$^{th}$ bit of the bit replacement signal, when the k$^{th}$ bit of the bit selection signal is the second logic level, the k$^{th}$ bit in the first random number sequence maintains to be the initial logic level.

6. The random number generating system according to claim 5, wherein the random number logic circuit comprises:
a second multiplexer, having a first input end receiving the first random number sequence, a second input end receiving the bit replacement signal, and a control end receiving the bit selection signal.

7. The random number generating system according to claim 4, wherein the random number replacement circuit comprises:
a second clock generator, generating a second clock signal, wherein an operation of the second clock generator is irrelevant to an operation of the random number generator; and
a second counter, receiving the second clock signal and the random number request signal so as to perform a cycle counting, and providing the bit replacement signal in response to the random number request signal.

8. The random number generating system according to claim 1, wherein when provision of the second random number sequence reaches a repeating number m, the random number logic circuit compares the $m+1^{th}$ second random number sequence with the first second random number sequence so as to determine whether to provide again the $m+1^{th}$ second random number sequence.

9. A random number generating method, comprising:
providing a first random number sequence with n bits by a random number generator in response to a random number request signal, wherein n is a positive integer;
providing a bit selection signal with n bits by a random number selection circuit in response to the random number request signal, wherein the bit selection signal is a time varying signal and determined by the random number request signal; and
adjusting the first random number sequence using the bit selection signal by a random number logic circuit in response to the random number request signal to provide a second random number sequence,
wherein the step of adjusting the first random number sequence using the bit selection signal comprises:
when a logic level of a $k^{th}$ bit of the bit selection signal is a first logic level, a logic level of a $k^{th}$ bit in the first random number sequence is set as an inverting logic level, wherein k is a positive integer smaller than or equal to n; and
when the logic level of the $k^{th}$ bit of the bit selection signal is a second logic level, the logic level of the $k^{th}$ bit in the first random number sequence maintains to be an initial logic level.

10. The random number generating method according to claim 9, further comprising:
providing a bit replacement signal with n bits by a random number replacement circuit in response to the random number request signal, wherein the bit replacement signal is a time varying signal and determined by the random number request signal; and
adjusting the first random number sequence using the bit selection signal and the bit replacement signal by the random number logic circuit in response to the random number request signal to provide the second random number sequence.

11. The random number generating method according to claim 10, wherein the step of adjusting the first random number sequence using the bit selection signal and the bit replacement signal to comprises:
when the $k^{th}$ bit of the bit selection signal is the first logic level, the $k^{th}$ bit in the first random number sequence is set as a logic level of the bit replacement signal; and
when the $k^{th}$ bit of the bit selection signal is the second logic level, the $k^{th}$ bit in the first random number sequence maintains to be the initial logic level.

12. The random number generating method according to claim 9, further comprising:
after provision of the second random number sequence reaches a repeating number m, comparing the $m+1^{th}$ second random number sequence with the first second random number sequence so as to determine whether to provide again the $m+1^{th}$ second random number sequence.

* * * * *